US 6,704,125 B1

(12) United States Patent
Mui et al.

(10) Patent No.: US 6,704,125 B1
(45) Date of Patent: Mar. 9, 2004

(54) AUTOMATIC ADF SCAN WINDOW COVER

(75) Inventors: Paul K. Mui, Boise, ID (US); Eric L. Andersen, Meridian, ID (US); Russell A. Mendenhall, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 653 days.

(21) Appl. No.: 09/639,144

(22) Filed: Aug. 15, 2000

(51) Int. Cl.[7] .................................................. H04N 1/04
(52) U.S. Cl. ........................ 358/474; 358/498; 358/497
(58) Field of Search ................................. 358/498, 497, 358/474, 494, 496; 355/75, 50, 66; 356/313; 271/4.01; 399/372

(56) References Cited

U.S. PATENT DOCUMENTS

| | | | | |
|---|---|---|---|---|
| 4,576,472 A | * | 3/1986 | Ito et al. ........................ | 355/50 |
| 5,077,579 A | * | 12/1991 | Shibusawa et al. ............ | 399/17 |
| 6,128,455 A | * | 10/2000 | Horiguchi et al. ........... | 399/124 |

* cited by examiner

Primary Examiner—Edward Coles
Assistant Examiner—Heather D Gibbs

(57) ABSTRACT

A scan window cover assembly in an imaging system includes a document feed system convertible between a manual feed mode, in which individual documents are placed manually onto a scan bed, and an automatic feed mode, in which an automatic document feeder moves documents over a scan window. The scan window cover assembly includes a scan window cover capable of selectively covering the scan window of the imaging system when the imaging system is in its manual feed mode, and can also include a cover actuating mechanism connected to the scan window cover. The cover actuating mechanism is adapted and constructed to move the scan window cover between a covering position blocking the scan window, and an open position outside the scan window. In systems wherein the automatic document feeder pivots to change the imaging system between its automatic feed mode and its manual feed mode, the cover actuating mechanism can be provided to move the scan window cover in response to the pivoting of the automatic document feeder, for example, by causing the scan window cover to slide in response to pivoting of the automatic document feeder.

20 Claims, 2 Drawing Sheets

AUTOMATIC ADF SCAN WINDOW COVER

FIELD OF THE INVENTION

The present invention relates generally to imaging systems with automatic document feeders. Specifically, the present invention relates to improving document handling in imaging systems having scan windows.

BACKGROUND OF THE INVENTION

Imaging systems such as printers, fax machines, scanners, and copiers are virtually omnipresent, and can be found in homes and offices worldwide. The development of such systems has facilitated improvements in communication that have in turn fostered a sea change in the way people live and work. Telecommuting, paperless offices, and intra-office networks represent but a few examples of the advancements that have been made possible by modern imaging systems.

Since these systems have become crucial to everyday existence, their reliability and smooth operation is paramount. It is therefore vitally important to design imaging systems so that downtime and work interruptions are minimized. This can be a daunting challenge, given the relative complexity of systems in which sheet material must be infed, moved through the imaging process, and outfed in a matter of seconds, or fractions of a second. The challenge is further complicated by the fact that humans are operating the system, thus introducing the factor of operator error as a source of problems.

Many imaging systems provide the capability for documents to be scanned, then copied or digitally transmitted. Such systems often are convertible between a manual feed mode, in which individual documents are placed manually onto a scan bed and a scan head is moved across a surface of the document, and an automatic feed mode, in which an automatic document feeder moves documents over a scan window overlaying the scan head in a stationary position. Conventional low-cost copiers and digital senders are equipped with automatic document feeders having a "U-turn" paper path. These automatic document feeders typically are pivotally connected to the imaging system, and can be thus be selectively placed into position over a glass flatbed of the system when automatic document feed is desired.

One common and recurring problem arises in such imaging systems in which there are no sensors in the flatbed to check for the presence of documents on the glass. Other than lifting the document feeder and visually inspecting the flatbed, there is no way for a subsequent user to detect the presence of an original document left on the glass by a previous user. If the original document covers the scan window as well, blank copies will be made or digitally transmitted. Further, when transparencies are scanned through the flatbed without a backing sheet, the scan window will show up as an unacceptable gray shaded area on the scanned image.

Of course, these problems can be solved by adding sensors to the flatbed, or by providing a separate, stationary scan head for the scan window. These solutions are less than desirable, since they increase the cost of the system, and/or increase the footprint of the system.

It can thus be seen that the need exists for simple, inexpensive, space-efficient document handling in imaging systems having scan windows.

SUMMARY OF THE INVENTION

The present invention is directed to a scan window cover assembly in an imaging system including a document feed system convertible between a manual feed mode, in which individual documents are placed manually onto a scan bed, and an automatic feed mode, in which an automatic document feeder moves documents over a scan window. The scan window cover assembly includes a scan window cover capable of selectively covering the scan window of the imaging system when the imaging system is in its manual feed mode.

The scan window cover assembly can also include a cover actuating mechanism connected to the scan window cover. The cover actuating mechanism is adapted and constructed to move the scan window cover between a covering position blocking the scan window, and an open position outside the scan window.

In systems wherein the automatic document feeder pivots to change the imaging system between its automatic feed mode and its manual feed mode, the cover actuating mechanism can be provided to move the scan window cover in response to the pivoting of the automatic document feeder, for example, by causing the scan window cover to slide in response to pivoting of the automatic document feeder.

The cover actuating mechanism can include at least one link arm having a first end pivotally connected to the scan window cover and a second end pivotally connected to the automatic document feeder. The scan window cover can be provided as a generally rectangular, planar cover member corresponding in size and shape to the scan window. The cover member can include an edge adapted to function as a registration edge for documents when the imaging system is in its manual feed mode, and can be fabricated from any suitable material, such as plastic.

A method of controlling access to the scan window in an imaging system is also set forth. The imaging system includes a document feed system convertible between a manual feed mode, in which individual documents are placed manually onto a scan bed, and an automatic feed mode, in which an automatic document feeder moves documents over a scan window. In a first step, a scan window cover capable of selectively covering the scan window of the imaging system is provided. Next, the scan window cover is caused to block the scan window when the imaging system is in its manual feed mode. The scan window cover is then caused to unblock the scan window when the imaging system is in its automatic feed mode.

DETAILED DESCRIPTION OF THE INVENTION

Figure 1:
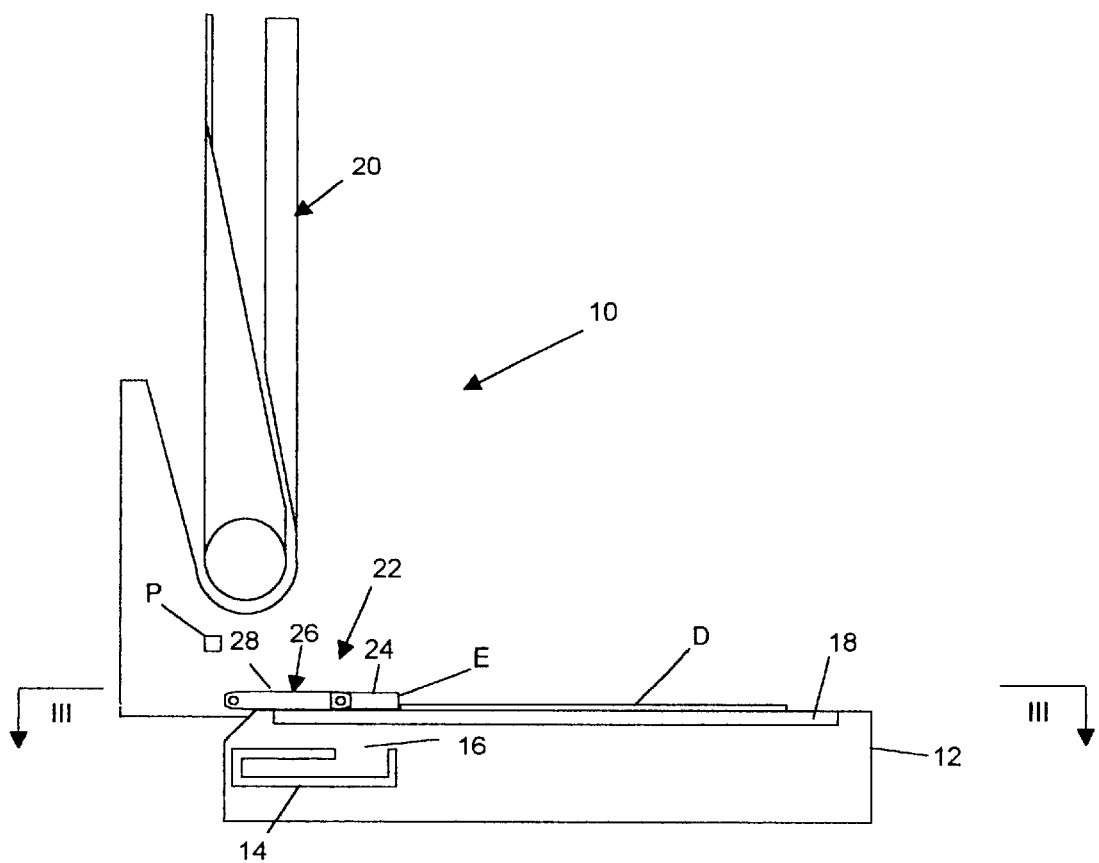
FIG. 1 is a schematic illustration of an imaging system having a scan cover assembly in accordance with the principles discussed herein.

An imaging system 10 in accordance with the principles of the present invention is illustrated in FIG. 1. The imaging system 10 includes a housing 12 in which a scan head 14 having a scan window 16 positioned beneath a glass scan flatbed 18. The imaging system 10 is in a manual feed mode, with an automatic document feeder 20 pivoted about a point P to a nonuse position. With the imaging system 10 in its manual feed mode, the scan head 14 is selectively movable in the direction of arrow A to pass the scan window 16 past a document D, in order to scan in the contents of documents D.

Figure 3:
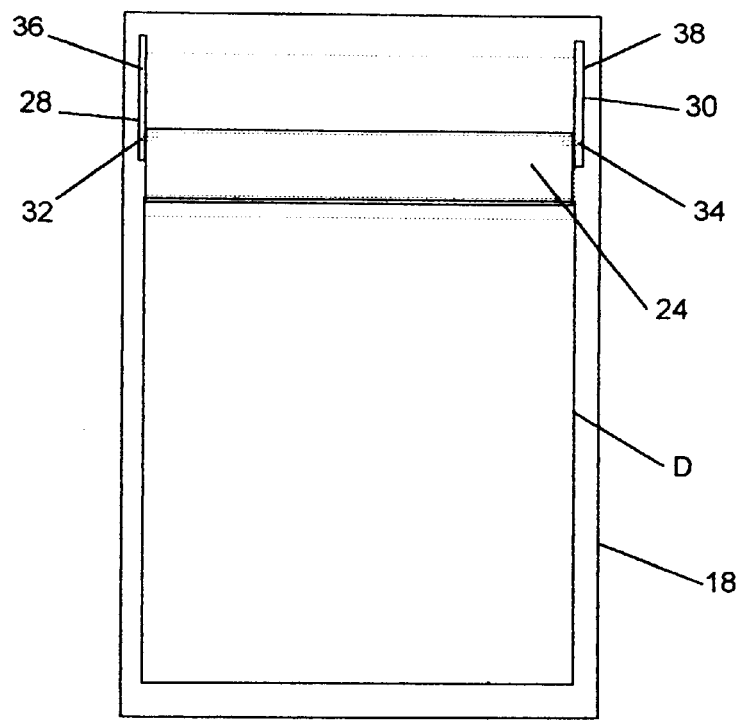
FIG. 3 is a schematic sectional view taken generally along lines III—III of FIG. 1.

As seen in FIGS. 1 and 3, the imaging system 10 also includes a scan window cover assembly 22. The cover assembly 22 includes a scan window cover 24 capable of selectively covering the scan window 16 of the imaging system 10. In the illustrated example, the scan window cover 24 is provided as a generally rectangular, planar cover corresponding in size and shape to the scan window 16. The cover 24 can be fabricated from any suitable opaque material, such as plastic. The cover includes an edge E adapted to function as a registration edge for documents D when the imaging system is in its manual feed mode.

The scan window cover assembly 22 includes a cover actuating mechanism 26. In the illustrated example, the cover actuating mechanism 26 has a pair of link arms 28, 30. Each of the link arms 28, 30 has a first end 32, 34 pivotally connected to the scan window cover 24, and a second end 36, 38 pivotally connected to the automatic document feeder 20. The link arms can be fabricated from any suitable material, such as plastic.

Figure 2:
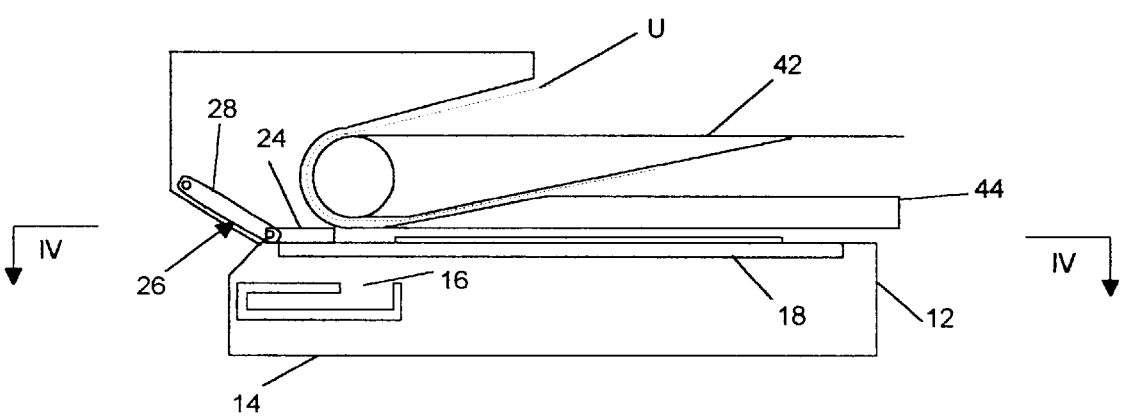
FIG. 2 is a schematic illustration of the FIG. 1 imaging system in an automatic document feed mode.
Figure 4:
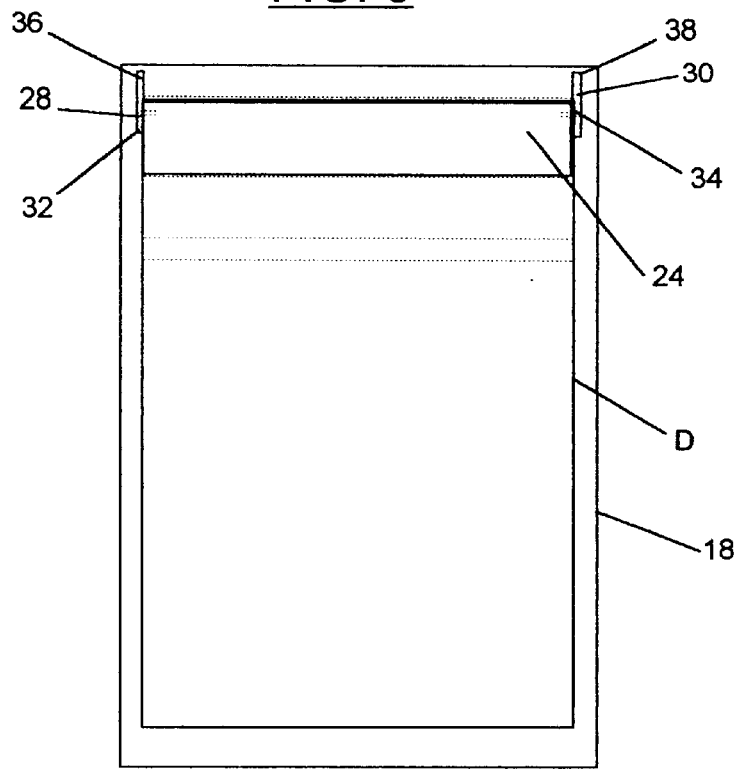
FIG. 4 is a schematic sectional view taken generally along lines IV—IV of FIG. 2.

The cover actuating mechanism 26 is adapted and constructed to move the scan window cover 24 between a covering position blocking the scan window 16 as seen in FIGS. 1 and 3, and an open position outside the scan window 16, as seen in FIGS. 2 and 4. In the illustrated example, the pivoting connection provided by the link arms 28, 30 cause the cover 24 to slide parallel to the plane of the flatbed glass 18 when the automatic document feeder 20 is pivoted. With the automatic document feeder 20 in its automatic feed mode as shown in FIGS. 2 and 4, the automatic document feeder 20 moves documents through a U-shaped feed path indicated by the arrow U, which moves the documents from an automatic document feeder input 40, over the scan window 16 with the scan head 14 in a stationary position, to an automatic document feeder output 42.

The present invention allows the imaging system to function irrespective of the presence of a forgotten document on the flatbed glass, as well as facilitating the generation of copies of transparencies without backing paper. The specific construction is susceptible to any number of variations. For example, the simple linkage illustrated could be replaced with a more mechanically sophisticated arrangement, such as gears, springs, or cams. Although the present invention has been described with reference to specific embodiments, those of skill in the art will recognize that changes may be made thereto without departing from the scope and spirit of the invention as defined by the appended claims.

What is claimed is:

1. In an imaging system including a document feed system convertible between a manual feed mode, in which individual documents are placed manually onto a scan bed, and an automatic feed mode, in which an automatic document feeder moves documents over a scan window, a scan window cover assembly comprising the following:
   a scan window cover capable of selectively covering the scan window of the imaging system, when the imaging system is in its manual feed mode.

2. A scan window cover assembly according to claim 1, further comprising a cover actuating mechanism connected to the scan window cover, the cover actuating mechanism being adapted and constructed to move the scan window cover between a covering position blocking the scan window and an open position outside the scan window.

3. A scan window cover assembly according to claim 2, wherein the automatic document feeder pivots to change the imaging system between its automatic feed mode and its manual feed mode, and wherein the cover actuating mechanism moves the scan window cover in response to the pivoting of the automatic document feeder.

4. A scan window cover assembly according to claim 3, wherein the cover actuating mechanism causes the scan window cover to slide in response to pivoting of the automatic document feeder.

5. A scan window cover assembly according to claim 4, wherein the cover actuating mechanism comprises at least one link arm having a first end pivotally connected to the scan window cover and a second end pivotally connected to the automatic document feeder.

6. A scan window cover assembly according to claim 1, wherein the scan window cover comprises a generally rectangular, planar cover corresponding in size and shape to the scan window.

7. A scan window cover assembly according to claim 6, wherein the cover includes an edge adapted to function as a registration edge for documents when the imaging system is in its manual feed mode.

8. A scan window cover assembly according to claim 1, wherein the scan window cover is fabricated from a plastic material.

9. In an imaging system including a document feed system convertible between a manual feed mode, in which individual documents are placed manually onto a scan bed and a scan head is moved across a surface of the document, and an automatic feed mode, in which an automatic document feeder moves documents over a scan window overlaying the scan head in a stationary position, a scan window cover assembly comprising the following:
   a scan window cover capable of selectively covering the scan window of the imaging system; and
   a cover actuating mechanism connected to the scan window cover and to the automatic document feeder, the cover actuating mechanism being adapted and constructed to move the scan window cover between a covering position blocking the scan window and an open position outside the scan window.

10. A scan window cover assembly according to claim 9, wherein the automatic document feeder pivots to change the imaging system between its automatic feed mode and its manual feed mode, and wherein the cover actuating mechanism moves the scan window cover in response to the pivoting of the automatic document feeder.

11. A scan window cover assembly according to claim 10, wherein the cover actuating mechanism causes the scan window cover to slide with respect to the scan window in response to pivoting of the automatic document feeder.

12. A scan window cover assembly according to claim 11, wherein the cover actuating mechanism comprises a pair of link arms, each of the link arms having a first end pivotally connected to a respective lateral edge of the scan window cover and a second end pivotally connected to the automatic document feeder.

13. A scan window cover assembly according to claim 10, wherein the scan window cover comprises a generally rectangular, planar cover corresponding in size and shape to the scan window.

14. A scan window cover assembly according to claim 13, wherein the cover includes an edge adapted to function as a registration edge for documents when the imaging system is in its manual feed mode.

15. A scan window cover assembly according to claim 14, wherein the scan window cover is fabricated from a plastic material.

16. In an imaging system including a document feed system convertible between a manual feed mode, in which individual documents are placed manually onto a scan bed, and an automatic feed mode, in which an automatic document feeder moves documents over a scan window, a method of controlling access to the scan window, the method comprising the following steps:

provide a scan window cover capable of selectively covering the scan window of the imaging system;

causing the scan window cover to block the scan window when the imaging system is in its manual feed mode; and causing the scan window cover to unblock the scan window when the imaging system is in its automatic feed mode.

17. A method according to claim 16, wherein the automatic document feeder pivots to change the imaging system between its automatic feed mode and its manual feed mode, and wherein the steps of causing the scan window cover to block the scan window and causing the scan window cover to unblock the scan window are performed in response to the pivoting of the automatic document feeder.

18. A method according to claim 17, wherein the step of causing the scan window cover to block the scan window comprises sliding the scan window cover to a position over the scan window.

19. A method according to claim 17, wherein the step of causing the scan window cover to unblock the scan window comprises sliding the scan window cover to a position outside the scan window.

20. A method according to claim 16, further comprising the following steps:

providing the scan window cover with a longitudinal edge; and using the longitudinal edge of the scan window cover as a registration edge for documents when the imaging system is in its manual feed mode.

* * * * *